United States Patent Office 3,451,885
Patented June 24, 1969

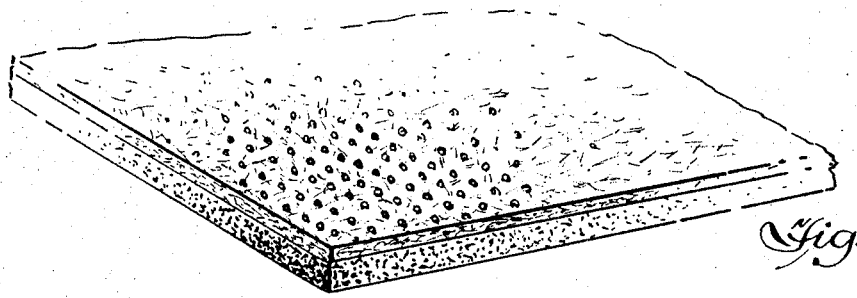
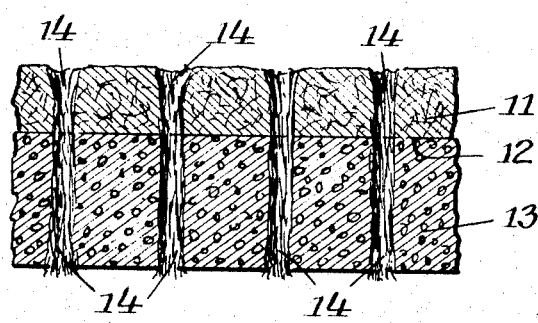
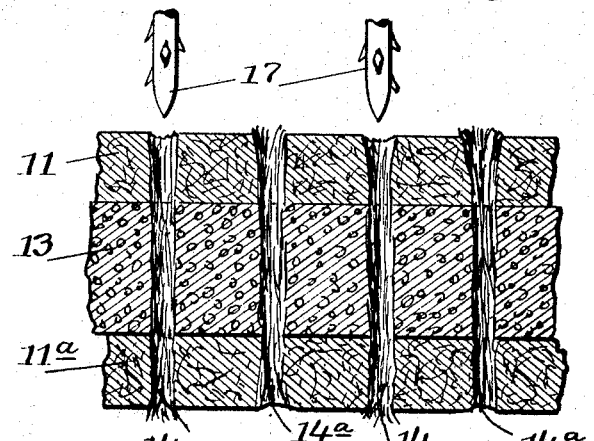
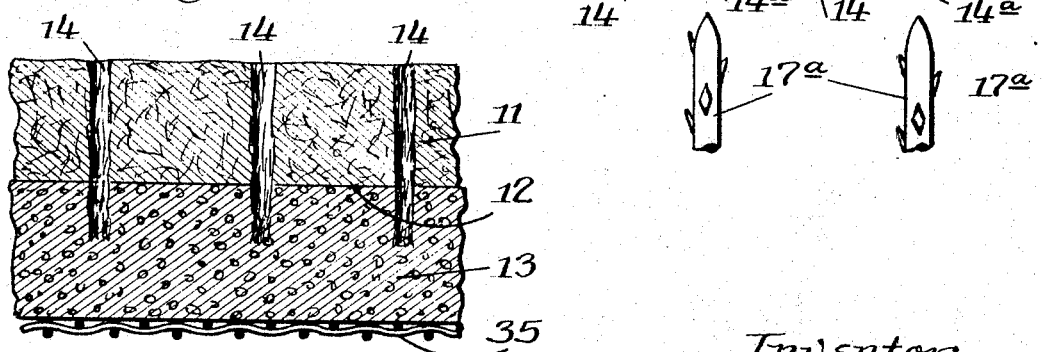

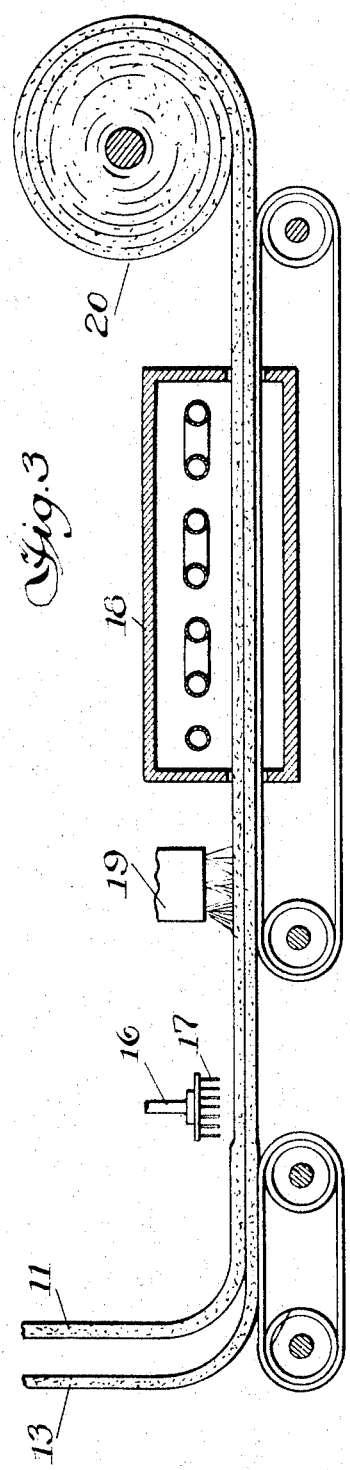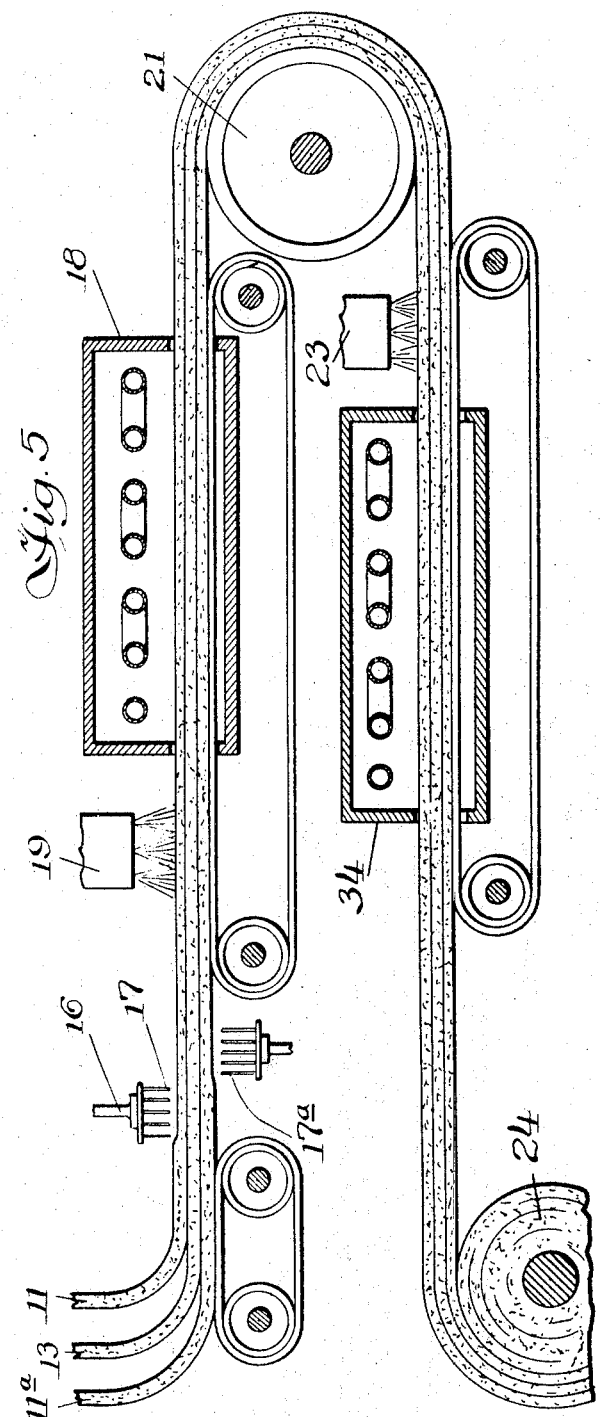

3,451,885
NEEDLED COMPOSITE WEB AND METHOD OF MAKING THE SAME
Joseph J. Klein, New York, N.Y., assignor to Union Carbide Corporation, a corporation of New York
Continuation-in-part of application Ser. No. 208,235, July 9, 1962. This application Sept. 24, 1964, Ser. No. 398,907
Int. Cl. B32b 5/18, 5/06
U.S. Cl. 161—80        19 Claims This invention relates to a composite web material and more particularly to a web material having a porous polymeric layer and a non-woven fibrous layer keyed to each other into a unitary structure. This application is a continuation-in-part of my copending application Ser. No. 208,235, filed July 9, 1962 and now abandoned.

In accordance with this invention a non-woven fibrous web made of fibers of staple length, preferably a low density non-woven fibrous web, is needled to a porous polymeric sheet to produce a unitary composite web material wherein the porous polymeric sheet lies proximal to the non-woven fibrous web, and preferably in direct interfacial contact therewith, and there are a plurality of fiber projections from said non-woven fibrous web into the polymeric sheet to key the web and the sheet into the unitary structure.

The non-woven fibrous web is made up of staple fibers which may lie randomly or may be substantially parallel, as in a card, air laid, or water laid web. Preferably the non-woven web is a low density web of high loft wherein the fibers are in a helter-skelter arrangement and in a three-dimensional lie. These webs are known materials.

The porous polymeric layer may be a flexible foam, a semi-flexible foam or a rigid foam. Polyurethane foams are preferred. Other polymeric foams such as polyvinyl chloride foams and rubber foams are also suitable. For convenience, the invention is described herein primarily as it relates to the embodiment utilizing a flexible foam.

In the embodiment wherein the porous layer is a flexible foam, the non-woven fibrous web and the foam are securely bonded to each other by the needling operation, as by the passage of closely spaced barbed needles through the fibrous web and into the flexible foam. The fibrous web is partially compressed by this treatment to a relatively higher density. The degree of compression may be controlled as described below for optimum suitability for particular end uses.

The composite web material of the flexible foam embodiment of this invention is particularly useful as cushioning, since it is more resilient than the flexible foam layer itself. It may be used, for example, as cushioning in ironing board pads and in commercial pressing machines. It is also particularly useful in cushioning for automobile seats.

The composite web material of the rigid foam embodiment of this invention is particularly useful as insulation, as for example in the construction field or in automobile headliners.

The composite web material of this invention is also readily bondable to surfaces to which the foams themselves are not readily bondable.

In one preferred embodiment of this invention, the fibrous layer of the composite material is sprayed after the needling with an adhesive to bond to each other fibers on the outer surface of the layer and, especially in the case where the fibrous layer was derived from a three-dimensional low density web, interiorly thereof. The adhesive may be a heat-sealable adhesive such as polyvinyl chloride. In this case, the composite may be used as a heat-sealable pad which may be adhered readily to solid surfaces.

It is often desirable to bond a cushioning material to a supported polyvinyl chloride resinous layer, as for example, in the fabrication of automotive door panels. Since polyurethane flexible foam cannot be heat-sealed to the polyvinyl chloride layer, it has been necessary in the industry to substitute the more expensive polyvinyl chloride foam for the polyurethane foam in order to get heat-sealability. By the use of the heat-sealable composite material of the invention, polyurethane foam may be firmly bonded to a polyvinyl chloride surface.

In another embodiment, preferred for automobile cushioning, little or no adhesive is applied to the fibrous layer, permitting greater freedom for the individual fibers of the non-woven layer and more opportunity for rearrangement of the fibers during use of the cushioning material, as will be explained in more detail below.

The invention may be more readily understood by reference to drawings in which FIGURE 1 is a partial perspective view of one embodiment of the composite web material;

FIGURE 2 is an enlarged sectional view of the embodiment of FIGURE 1;

FIGURE 3 is a side elevation, with portions of the apparatus shown in section, illustrating the process for making the web material of FIGURE 2;

FIGURE 4 is an enlarged sectional view of another embodiment of this invention;

FIGURE 5 is a side elevation generally similar to FIGURE 3, illustrating the process for making the embodiment of FIGURE 4; and FIGURE 6 is an enlarged cross sectional view of still another embodiment of this invention, particularly suitable for automobile seat cushioning.

In the embodiment of FIGURES 1 to 3 the non-woven fibrous web 11 has an interface of contact 12 with polymeric sheet 13. There are closely spaced fiber punches 14 passing through the fibrous web and into the polymeric sheet, preferably through the entire thickness of the polymeric sheet. In the punches the staple fibers which make up the fibrous web are aligned normal to the surface of the polymeric sheet and project thereinto.

Punches 14 are formed by the penetration of barbed needles through the fibrous web and into the polymeric sheet. The needle barbs are small pointed or flared extensions on the needles which serve to hook onto the fibers of the batt and draw such fibers through the batt and into the foam while leaving the needles withdrawable from the foam without shredding or tearing it. The needling fixes the staple fibers in the fibrous web relative to each other at spaced points and fixes the fibrous web to the polymeric sheet securely along interface 12.

In a specific embodiment, described with reference to FIGURE 3, a loose fibrous random three-dimensional batt 11 of 5½ denier staple fibers about 1½" to 2" long and having about 8 crimps to the inch is brought into contact with a sheet of flexible polyurethane foam 13 and moved together with the foam into a needling machine 16 at a rate of 10 feet per minute. The batt is 54" wide and 2" thick and is composed of cellulose acetate fibers. It weighs about four ounces per square yard. The polyurethane foam is 54" wide and ½" thick and has a density of 1½ lbs. per cu. ft.

The spacing of the needles 17 of the needling machine and the number of strokes per minute are adjusted to provide 300 punches per square inch in the composite. The needles are barbed as is conventional in needles for fibrous batts. In the preferred form of the invention the stroke of the needles is adjusted so that the foremost barb passes through the foam. The batt is supported at the needling point by a perforated plate, not shown.

After passing through the needling machine, the batt is compressed to about ¼" thickness and is firmly attached to the polyurethane foam. The composite web is then passed under spray head 19 and sprayed on its fibrous side with an adhesive material suitably a polyvinyl chloride latex. The latex has a solids content of about 55 wt. percent and is sprayed onto the fibrous side of the composite web in an amount sufficient to deposit about four ounces per square yard of polyvinyl chloride on the batt.

After spraying the composite web is passed through a dryer 18 maintained at about 325° F. to evaporate the water from the latex. Residence time in the dryer is about four minutes. The composite web is taken up on roll 20 for storage or use, as desired.

The composite web thus produced is an integral structure in that its component layers are not readily separable. The tensile strength of the composite is much higher than that of the polyurethane foam itself. The composite is of greater density than that of the polyurethane foam and has a softer hand than that of the foam itself. In addition, the composite maintains its loft in constant usage, while the foam has a tendency to take a permanent set after repeated compression cycles.

In the embodiment of FIGURES 4 and 5 a non-woven fibrous web is needled to each side of a porous polymeric sheet. FIGURE 4 shows a composite web material similar to that of FIGURE 2 but containing an additional non-woven fibrous layer 11a on the opposite side of polymeric sheet 13 and additional fiber punches 14a entering the composite web material from a direction opposite that of punches 14. The fiber punches from the layers 11 and 11a may be more or less directly opposed to each other or they may be offset substantially as desired.

The method of preparing the composite web material of FIGURE 4 is shown in FIGURE 5 wherein the first portion (to dryer 18) is substantially identical to the process described with reference to FIGURE 3 except that an additional fibrous web 11a is brought into contact with the underside of the foam sheet 13 and the needling machine 16 includes needles 17a which pass into the composite web from its underside through batt 11a.

After passage of the composite web through dryer 18 it is passed over roll 21 to reverse its direction and turn its underside upward. Spray head 23 and dryer 34 are similar to spray head 19 and dryer 18 and effect the coating of the fibers of the non-woven layer 11a with a heat-sealable adhesive. The composite web is then taken up on roll 24 for storage or use as desired.

The composite web of FIGURE 4 having non-woven fibrous layers on both sides of a flexible foam is particularly suitable for uses where heat-sealability to both sides of a foam layer is desired. For example, in some car door installations it may be desired to heat-seal a cushioning material to both a metal door base and a vinyl resin covering material.

For some purposes, e.g., automobile seat cushioning, it is desirable to limit the degree of compression of the non-woven fibrous batt so that it may retain most of its original loft. For such purposes, the degree of penetration of the needle barbs into the foam is limited, as shown in FIGURE 6. When the fiber projections into the polymeric foam are limited, as in the embodiment of FIGURE 6, the needling step causes comparatively little compression of the foam. It is preferable for minimum compression to have the needle barbs penetrate no more than about half way through the thickness of the fibrous batt.

In FIGURE 6 numerals identical to those of FIGURE 2 identify comparable elements and element 35 identifies a loosely woven open mesh fabric, such as tobacco cloth which is applied to the flexible foam with a resinous adhesive such as polyvinyl chloride.

Alternatively, if desired, the degree of compression of the non-woven fibrous batt may be controlled by the density of needling rather than the depth of penetration. Slower passage of the batt and foam past the needling position (at the same needling rate) results in more dense needling and more compressed batts while faster traverse of the batt and foam past the needling position results in less compresion and higher loft.

Although the invention has been described in detail with respect to specific embodiments thereof, it is to be understood that numerous departures and modifications are possible within the scope thereof and according to the specific requirements of the intended use.

For example, the non-woven fibrous batt or batts may be made of any staple fiber which lends itself to the formation of a non-woven needled fibrous batt for a particular purpose. The staple fiber may be a natural staple such as cotton or wool, or a man-made staple such as viscose or cuproammonium rayon fibers, nylon fibers, acrylic or modacrylic fibers, polyester fibers, polyolefin fibers or polyacetal fibers. The denier of the fibers may vary considerably, a suitable range being from about 3 to about 22 denier. The staple fiber is preferably crimped, usually having between about 3 and about 15 crimps to the inch. The staple length may vary considerably from about ¾" to about 4". Mixtures of fibers may be used in the batt, and a small proportion, say up to about 15% by weight, may be shorter fibers down to and including fibers of papermaking length. When two batts are used they may be of the same or different fiber compositions.

The thickness of the fibrous web layer (after needling) may vary suitably from about ⅛" to about ½". The weight of the non-woven fibrous web or webs may also vary depending on the intended use of the composite web and upon its thickness. A suitable range is from about 2 to about 20 ounces per square yard with greater weights associated with greater thicknesses. The weight of web per ⅛" thickness is usually not greater than about 6 ounces per square yard.

The flexible foam may vary in composition, density, and thickness. A suitable range of thickness is about ⅛" to about 1". The density of the polyurethane foam may vary from about 1.2 lbs. per cubic foot to about 3 lbs. per cubic foot. Natural latex foams are heavier and range from about 3 to about 6 lbs. per cubic foot. Vinyl foams are still heavier ranging from about 6 to 12 lbs. per cubic foot.

The needling rate and the spacing of the needles may be varied, as discussed above, to produce more closely spaced punches or less closely spaced punches in the composite web and thereby compress the non-woven batts to a greater or lesser degree. A suitable range of needle spacing is from about 150 to about 350 punches per square inch. The depth of the needle punch may be adjusted as discussed above to completely penetrate the foam (as in FIGURES 2 and 4) or partially penetrate the foam (as in FIGURE 6). In some cases, it may be desirable to provide for some needling at partial penetration of the foam and some needling at full penetration to avoid excessive compression while providing better anchoring of the two layers to each other.

In most cases, the needles pass through the nonwoven fibrous web and into the foam in a direction normal to the surface of the foam. If desired however, the needles may pass into the foam at an angle of incidence which is oblique to normal but which is still a steep angle. Steep angles of incidence from about 70° to 90° are suitable.

If desired, the non-woven fibrous web and the fibrous foam need not be in direct contact along their interfacial surfaces. The fibrous web and the foam may be in indirect solid contact, in whole or in part, with a layer of another web material, such as a mesh fabric layer, interposed between the two. The use of such an intermediate layer may enhance the stiffness and/or the tensile strength of the composite web material. Jute or cotton mesh is suitable for an intermediate layer although any woven or non-woven textile may be needled between the fibrous and foam layers described above in the same operation. Alternatively, it may be desired to needle a textile material at the outer surface of the non-woven web material for added strength and/or surface protection.

The amount of polyvinyl chloride latex used to provide heat-sealability may vary with the weight of the non-woven layer. Generally, the weight of the polyvinyl chloride is equal to or somewhat greater than the weight of the dry non-woven layer when heat-sealability is desired. In place of polyvinyl chloride other adhesives may be used, if desired. If desired, and particularly with non-fibrous webs of high density (where it may be difficult for the latex to penetrate the entire thickness of the web), it may be desirable to incorporate a low melting staple fiber into the initial loose batt to be needled. A staple of a copolymer of vinyl chloride and vinyl acetate may be used, for example, it may be included in the non-woven fibrous web in an amount up to about 35% weight thereof. Such fibers soften at about 165° F. and co-act with the polyvinyl chloride latex to provide bonding of the high melting fibers in the web when dielectric heating is applied.

It may also be desired to spray either the upper or the lower surface of the loose fibrous web before needling with a relatively small amount of resin to give the web more body during handling and to affect the properties of the finished composite material. When an adhesive resin such as polyvinyl chloride latex is used for this purpose, the needling operation drives the resin coated fiber from the outer surface to the interior of the batt and the interior of the flexible foam. When the batt is heated dielectrically this causes bonding in the interior of the batt and enhances the adhesion of the non-woven layer to the flexible foam layer of the composite web.

In some cases, where heat-sealability is not required (as, for example, for cushioning material in a seat insert), lesser amounts of latex coating material may be used or coating materials may be used which are not readily softened by heat. Alternatively, the resinous coating material may be entirely eliminated.

In a typical embodiment used for automobile cushioning, a non-woven fibrous batt having a weight of about 6 to 10 and preferably about 8 ounces per square yard is sprayed with a small amount (about one ounce per square yard) of polyvinyl chloride adhesive and then needled to a polyurethane foam of about ¼" to ⅜" thickness having a tobacco cloth backing adhered thereto (as in FIGURE 6). The depth of penetration is controlled so that most barbs do not pass through the foam, although a small percentage of barbs penetrate through the opposite surface of the foam.

When such cushioning is used in automobile seats or back rests, it is usually positioned with the non-woven batt disposed outwardly and covered with an upholstery fabric. When the shifting weight of a seated person is applied to the cushioning material, the individual fibers of the non-woven batt are easily rearranged since little or no resinous binder is used in this embodiment. The ease of rearrangement of the fibers in the batt causes fibers to spring back after pressure is removed or causes fresh fibers to spring upwardly to replace some of the top fibers when some of the original top fibers are compressed into the batt. Thus, by the abrasion caused by application of moving weight to the upholstery covering, compressed fibers at the upper surface of the batt are replaced by fresh fibers which move to the upper surface and the loft and springiness of the cushioning are maintained.

In the embodiment wherein the porous layer is a rigid foam, the needling operation is carried out in the same manner as with the flexible foam except that abrupt changes in the direction of movement of the rigid foam are avoided in view of the tendency of rigid foams to crack when sharply bent. However, despite the brittleness of rigid foams, it has been found that they are not broken or crumbled by the needling operation and that upon withdrawal of the needles they hold the inserted fibers well.

I claim:

1. A composite web material comprising a flexible foam sheet proximal to a non-woven fibrous web having a plurality of staple fibers, said fibrous web having an interface proximal to said flexible foam sheet and having a plurality of fibers which project therefrom into said flexible foam sheet in a direction substantially normal to said interface and which terminate substantially short of the outer surface of said foam sheet, said fibers being held in said foam layer solely by frictional engagement with said foam.

2. The web material of claim 1 wherein most of said fibers projecting into said flexible foam sheet do not penetrate beyond about one half the thickness of said flexible foam sheet.

3. The web material of claim 1 wherein said non-woven fibrous web weighs not more than 6 ounces per square yard per ⅛ inch of thickness.

4. The web material of claim 1 wherein said foam contains at least 150 needle penetrations per square inch.

5. A composite web material comprising a rigid foam sheet proximal to a non-woven fibrous web having a plurality of staple fibers, said fibrous web having an interface proximal to said rigid foam sheet and having a plurality of fibers which project therefrom into but not through said rigid foam sheet in a direction substantially normal to said interface.

6. A composite web material comprising a nonwoven fibrous web needled to a sheet of flexible foam, the needled fibers of said web extending into but not through said foam sheet and said fibrous web having a coating of a heat-sealable adhesive on the outer surface of said fibrous web.

7. The web material of claim 6 wherein said heat-sealable adhesive comprises an amount up to about 35% by weight of said fibrous web.

8. The web material of claim 6 wherein said heat-sealable adhesive comprises an amount up to about one ounce per square yard of said composite web material.

9. A composite web material comprising two nonwoven fibrous webs, each needled to the opposite side of a sheet of flexible foam and the needled fibers of said webs extending into but not through said foam sheet.

10. A composite web material comprising a nonwoven fibrous web, a sheet of flexible foam and an intervening woven fabric sheet, said web being needled to said sheet of foam through said woven sheet and the needled fibers of said web extending into but not through said foam sheet.

11. A composite web material comprising a nonwoven fibrous web, a sheet of flexible foam, and an open mesh woven fabric adjacent to said flexible foam, said web being needled to said sheet of foam, the needled fibers of said web extending into but not through said foam sheet, and said open mesh fabric being attached to the free surface of said foam opposite said fibrous web.

12. A method of preparing a composite web material which comprises needling a non-woven fibrous web to a porous polymeric sheet, the needled fibers of said web extending into but not through said sheet.

13. A method of preparing a composite web material which comprises needling a non-woven fibrous web to a sheet of flexible foam with at least 150 needle penetrations per square inch, the needled fibers of said web extending into but not through said foam sheet.

14. A method of preparing a composite web material which comprises needling a non-woven flexible web to a sheet of flexible foam, the needled fibers of said web extending into but not through said foam sheet, and thereafter coating said non-woven fibrous web with a heat-sealable adhesive.

15. A method of preparing a composite web material which comprises needling a non-woven fibrous web to each side of a sheet of flexible foam, the needled fibers of said webs extending into but not through said foam sheet, coating the fibrous web on one side thereof with the latex of a heat-sealable adhesive resin, evaporating substantially the water from said latex coated fibrous web, thereafter coating the opposite side of the non-woven fibrous web with the latex of a heat-sealable resin and finally evaporating the water therefrom.

16. A heat-sealable cushioning material comprising a non-woven fibrous web needled to a sheet of flexible polyurethane foam, the needled fiber of said web extending into but not through said foam sheet, said fibrous web being coated with a heat-sealable polyvinyl chloride adhesive.

17. The cushioning material of claim 16 wherein said adhesive weights not more than about one ounce per square yard of cushioning material.

18. A heat-sealable cushioning material comprising two non-woven fibrous webs each needled to the opposite side of a sheet of flexible polyurethane foam, the needled fibers of said web extending into but not through said foam sheet, and each having a coating of a heat-sealable polyvinyl chloride adhesive on the outer surface of said fibrous web.

19. A heat-sealable cushioning material comprising a non-woven fibrous web needled to a sheet of flexible foam, the needled fibers of said web extending into but not through said foam sheet, said non-woven fibrous web containing a minor proportion of a low melting staple fiber.

References Cited

UNITED STATES PATENTS

| | | | |
|---|---|---|---|
| 2,949,394 | 8/1960 | Rodman | 161—189 X |
| 2,994,617 | 8/1961 | Proctor | 161—227 X |
| 3,122,140 | 2/1964 | Crowe | 128—296 |
| 3,245,854 | 4/1966 | Etchison et al. | 161—81 X |
| 2,232,647 | 2/1941 | Zirkman | 161—81 XR |
| 2,429,486 | 10/1947 | Reinhardt | 28—72.2 XR |
| 2,528,129 | 10/1950 | Francis | 161—80 |
| 2,970,365 | 2/1961 | Morgenstern | 161—81 |
| 3,010,180 | 11/1961 | Hoffman | 161—154 XR |
| 3,030,256 | 4/1962 | Rosenthal | 161—53 |
| 3,059,312 | 10/1962 | Jamieson | 161—154 XR |

FOREIGN PATENTS

| | | |
|---|---|---|
| 646,875 | 8/1962 | Canada. |
| 1,262,737 | 4/1961 | France. |

ROBERT F. BURNETT, *Primary Examiner.*

R. L. MAY, *Assistant Examiner.*

U.S. Cl. X.R.

28—72.2; 156—148; 161—159